Orig. 24,772

Wilson, Green & Wilson,

Powder Keg,

No. 1,383, Reissued Jan. 6, 1863.

Witnesses

Geo. Sterling

Robert Lathrop

Inventor

James Wilson

Charles Green

Wm. Wilson Jr.

UNITED STATES PATENT OFFICE.

JAMES WILSON, CHARLES GREEN, AND WILLIAM WILSON, JR., OF WILMINGTON, DELAWARE.

IMPROVEMENT IN CONSTRUCTION OF POWDER-KEGS.

Specification forming part of Letters Patent No. 24,772, dated July 12, 1859; Reissue No. 1,383, dated January 6, 1863.

*To all whom it may concern:*

Be it known that we, JAMES WILSON, CHARLES GREEN, and WILLIAM WILSON, Jr., of Wilmington, in New Castle county, and State of Delaware, have invented a new and Improved Powder-Keg; and we do declare the following to be a full and exact description of the same, reference being had to the accompanying drawings, making a part of this specification, in which—

Figure 1:
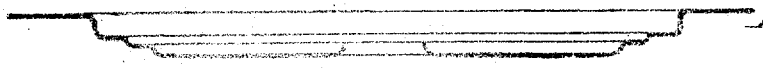
Figure 2:
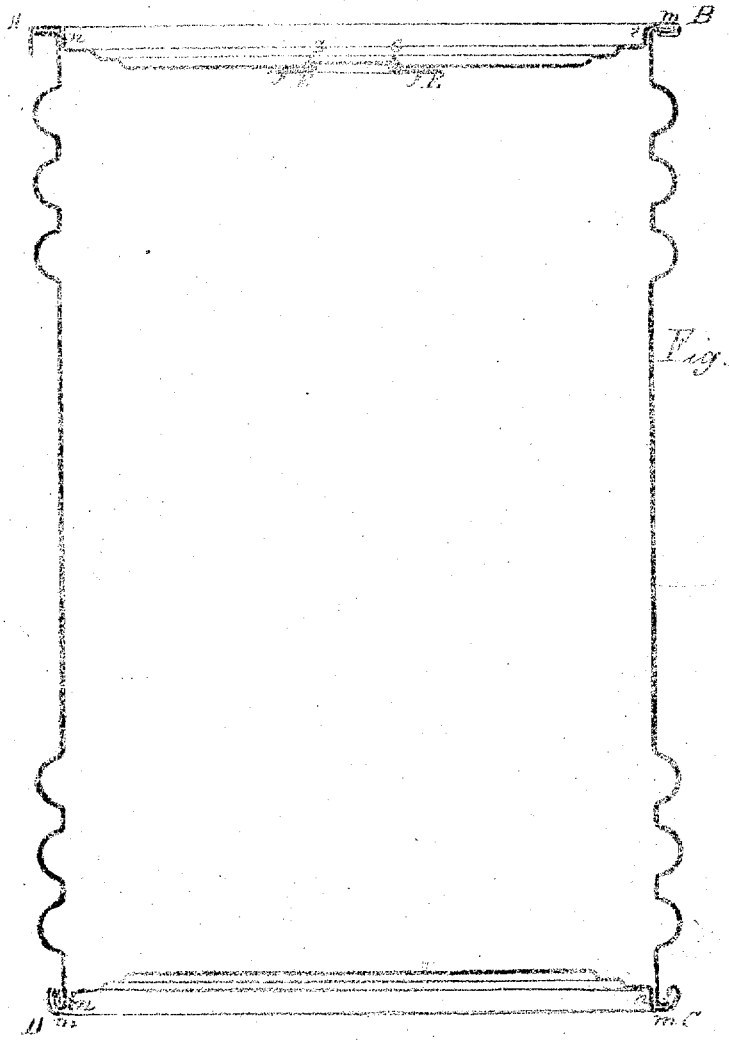

Figure 1 represents the head of the keg as constructed by us, and Fig. 2 the position of the head when attached to the keg.

The nature of our invention consists in constructing one or both of the heads of a metallic keg with a shoulder, *n*, and external flange, *m*, the shoulder being made deep enough to permit of the use of an external mandrel to resist the tool by which the seam is formed; and it further consists in employing a mandrel or other instrument against the shou der *n*, in order to form the seam which united the head to the keg, thus obviating the necessity of placing a mandrel within the keg, and affording a means of seaming the final head in the keg. This head also gives a better support to the keg than the old plain head. The head is stamped from a thin sheet of metal by a die of the shape shown in Fig. 2, so as to form the shoulder *n* and flange *m*. This head is then placed upon the cylinder, the flange of the head resting upon the edge of the cylinder or upon a flange formed on the end of the cylinder. When the flange is formed upon the end of the cylinder, it is one-half the width of the flange upon the head. The flange *m* being bent down, as shown at A, is firmly pressed upon the flange of the cylinder, as shown at B. The whole is then bent at an angle, as shown at C, in order that in the next operation it may be firmly pressed upon the side of the cylinder, as shown at D, the mandrel or other instrument being used on the exterior against the shoulder *n* during the operation. By these means—that is, forming the heads so as to have a shoulder and exterior flange upon them, and then sinking them into the cylinder, so that a mandrel or other instrument can be used upon the exterior at shoulder *n*, the cylinder entering and being pressed tight between said shoulder and outside seam or double lapping—a water-tight keg is produced out of blacl or sheet iron at much less expense than forme ly, plated iron having to be used formerly in order that the final head might be soldered to the keg. From the support given to the cylinder by the shoulder *n*, the risk of breaking in transportation is avoided. When only a single seam is desired, the flange on the cylinder is dispensed with, and the flange *m* on the head is not made so wide, and is bent over and pressed firmly on the edge of the cylinder.

Hitherto it has been practicable to double-seam on one head by inserting a mandrel or other suitable instrument within the cylinder; but it has been impossible to double-seam the final head, because a mandrel or other instrument could not be inserted within the keg. If desired, one head might be inserted, in the usual way, by means of a mandrel upon the interior. In one head a hole is struck by the die in such a manner that upon the upper side an elevation is produced around the hole, as shown at E E. Upon the under side a small plate, F F, having a corresponding opening, but smaller, is riveted to the head. A cap, G G, fits upon the opening in the plate F F. After the keg is filled this cap may be sealed upon the head.

What we claim as our invention, and desire to secure by Letters Patent, is—

Making one or both heads of the keg with the shoulder *n* and flange *m*, and using a mandrel upon said shoulder *n*, in order to seam one or both heads to the keg.

JAMES WILSON.
CHARLES GREEN.
WM. WILSON, JR.

Witnesses:
HU. STIRLING,
ROBERT LEITHEAD.